United States Patent Office 2,899,859
Patented Aug. 18, 1959

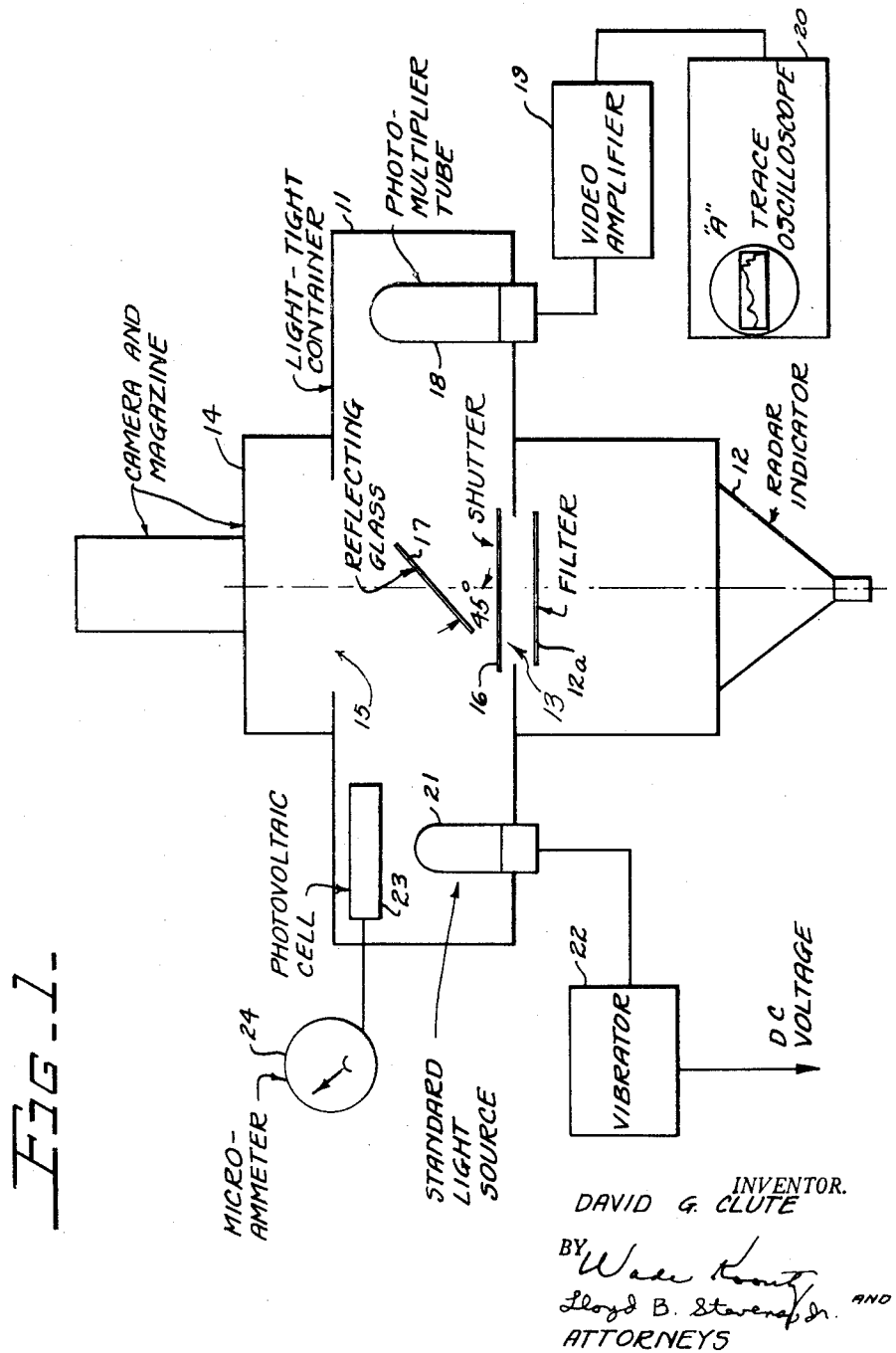

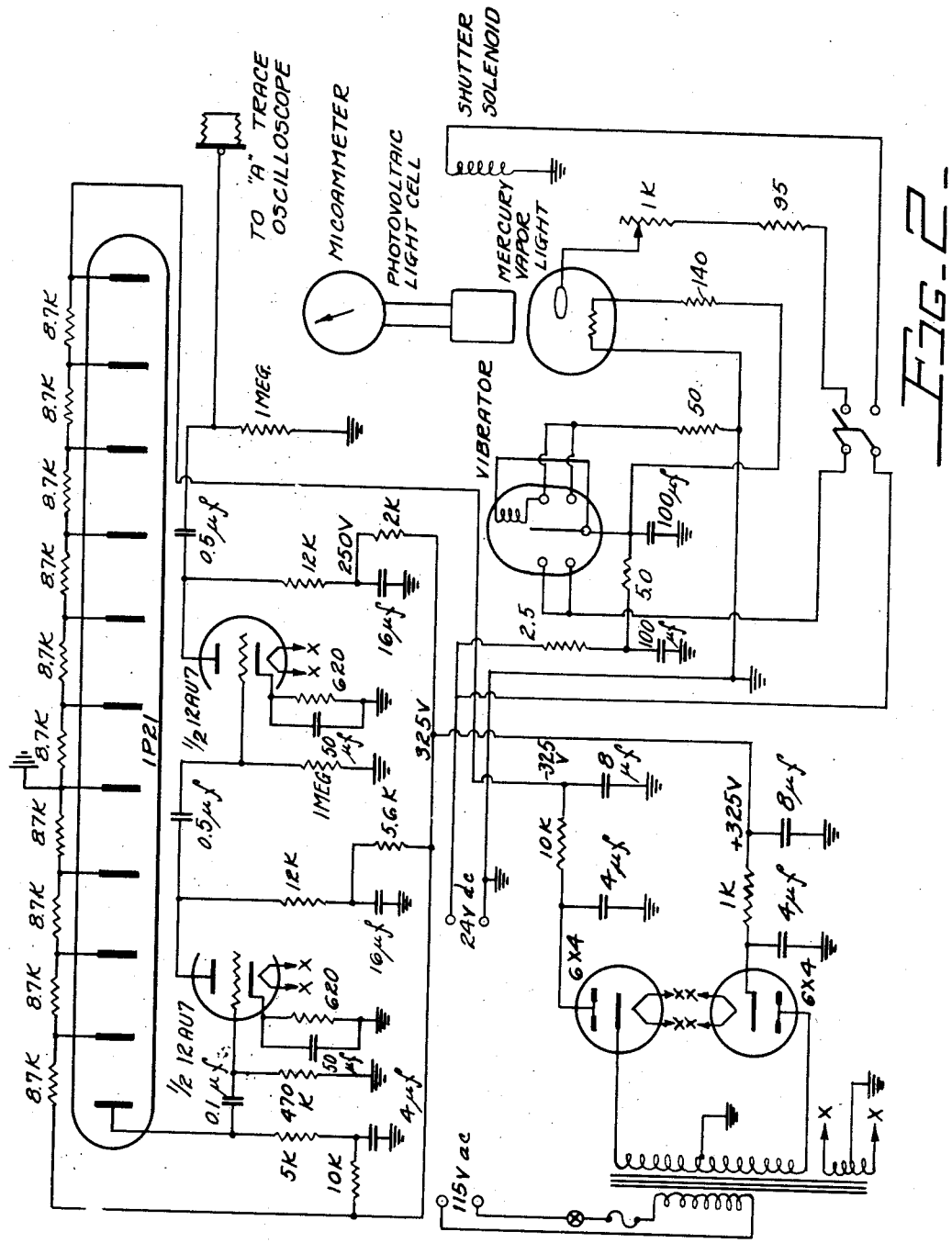

2,899,859

EXPOSURE METER FOR CATHODE-RAY TUBE PRESENTATION PHOTOGRAPHY

David G. Clute, Dayton, Ohio

Application April 14, 1955, Serial No. 501,458

6 Claims. (Cl. 88—23)

(Granted under Title 35, U.S. Code (1952), sec. 266)

The invention described herein may be manufactured and used by or for the United States Government for governmental purposes without payment to me of any royalty thereon.

This invention relates to an exposure meter adapted for photography of cathode-ray tube presentations and a method for obtaining the proper exposure for these pictures. More particularly the invention relates to an exposure meter useful on radar and television screen pictures and a method for obtaining the proper exposure for these pictures.

The need for good photographs of radar pictures for bombing, navigation, guided missile and other uses has become of increasing importance. When an opportunity is presented to take a radar picture of certain terrain it may be the only chance that will be presented. If the picture is not properly exposed vital information which is attempted to be gained will not be obtained. Also there is a need for an exposure meter to use in taking pictures of television screens. Conventional exposure meters and techniques are not suitable for use in obtaining pictures of cathode-ray tube presentations such as radar and television screen pictures.

It is an object of this invention to provide an exposure meter which will provide the information needed to determine a suitable exposure for photographing cathode-ray tube presentations.

It is another object of this invention to provide an exposure meter usable in taking radar photographs.

It is an additional object of this invention to provide an exposure meter suitable for use in taking photographs of television screen pictures.

It is a further object of this invention to provide a method for obtaining information needed to determine a suitable exposure for photographing cathode-ray tube presentations.

It is still another object of this invention to provide a method for obtaining information needed to determine a suitable exposure for photographing television screen pictures.

It is a primary object of this invention to provide both an exposure meter and a method to obtain information needed to determine a suitable exposure for photographing radar screen pictures.

These and other objects of the invention will become apparent as the detailed description of the invention proceeds.

By the invention an exposure meter is provided having a photoelectric means, e.g., a photomultiplier tube and a video amplifier; an oscilloscope having a calibrated screen, preferably an "A" trace oscilloscope; a standard light source, which can be a mercury vapor light of adjustable intensity. As a part of the meter a photoelectric means such as a photovoltaic cell and a microammeter can be provided to measure the intensity of the standard light source; however, alternatively this apparatus need not be a part of the exposure meter but rather a separate piece of apparatus which can be used with the exposure meter, if required. It is desirable that certain of the components of the meter be mounted in or viewing into a light-tight container which provides an opening for mounting a cathode-ray tube screen such as a radar or television screen and an opening for mounting a camera to photograph the cathode-ray tube presentation. It is necessary to use a filter in the light path between the photoelectric means and the cathode-ray tube presentation to permit substantially only the light of short persistence to reach the photoelectric means, if the presentation contains light from long persistence phosphor; however, no filter need be used, if only a short persistence phosphor is used on the face of the cathode-ray tube. For the purposes of this invention short persistence light is defined as light having a persistence short in comparison with the writing speed of the electron beam of the cathode-ray tube. A shutter either manually operated or synchronized to shut off the light from the cathode-ray tube to the photoelectric means when the standard light source is operated can be used. It is preferred to operate the standard light source in an off-on intermittent method such as a square wave fashion, a vibrator circuit being a satisfactory means to accomplish this.

In addition a method is provided by this invention wherein exposure meter apparatus such as is described above and later in detail is used for aiding in determining a suitable exposure for photographing cathode-ray tube presentations wherein a photoelectric means is independently exposed to a cathode-ray tube presentation to be photographed and to a standard light source; and the controls of the standard light source, the cathode-ray tube, and the oscilloscope connected to the photoelectric means output are adjusted to give a presentation on the oscilloscope screen filling the space between the subject calibration lines on the oscilloscope screen when the cathode-ray tube presentation is viewed by the photoelectric means and filling the space between the standard light source calibration lines on the oscilloscope screen when the standard light source is viewed by the photoelectric means. The intensity of the standard light source is then indicative of a suitable f stop at which to photograph the particular cathode-ray tube presentation. If the intensity of the standard light source is not known, the standard light source may be exposed to a photoelectric means such as a photovoltaic cell connected to a microammeter to determine its intensity. It is necessary to view the cathode-ray tube presentation with the photoelectric means through a filter passing substantially only light of short persistence, if the presentation contains light from long persistence phosphor. In this method it is possible to start from at least one of two more or less arbitrarily chosen points, namely a selected f stop number or a selected cathode-ray tube presentation, the latter starting point being preferred.

The invention will be more clearly understood from the following detailed description of a specific example thereof read in conjunction with the accompanying drawings wherein:

Fig. 1 is a schematic view of the exposure meter and related apparatus;

Fig. 2 is a circuit diagram of the exposure meter;

Figure 4:
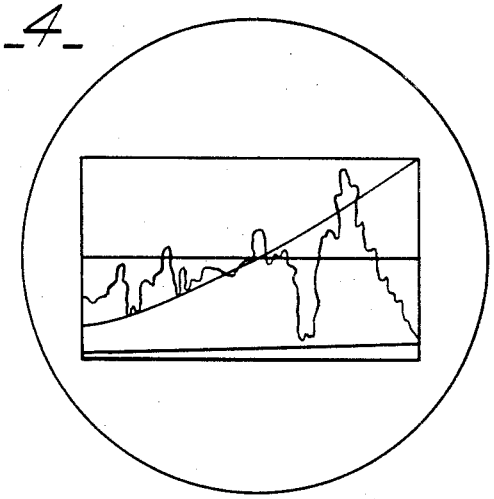
Fig. 4 is a view similar to Fig. 3 with the addition of a typical radar picture that might appear on the "A" scope screen during use.

Fig. 1 shows the arrangement of the elements of the exposure meter and of the radar indicator and camera. Fig. 1 shows a light-tight container 11 mounted on the radar indicator 12, opening 13 having been provided in container 11 for the radar screen. A filter 12a is placed over the radar screen. For example, if a 5FP14 cathode-ray tube having short persistence phosphor emitting blue light and long persistence phosphor emitting yellow light is used, a blue filter will allow only the blue light of about 4400 angstrom wave length to reach the photomultiplier tube. The camera and magazine 14 are mounted in a second opening 15 in container 11. A shutter 16 covers opening 13 of the container. When the shutter is closed light from the radar screen is prevented from entering the container. A piece of plate glass 17 which can be ordinary window glass is mounted at a 45° angle in the light path between openings 13 and 15, i.e., in the light path between the radar screen and the camera. Most of the light from the radar screen is transmitted through glass 17 to the camera.

However, a small proportion of the light from the radar screen of the order of about 15% is reflected by glass 17 on to photomultiplier tube 18. A video amplifier 19 is connected to the output of photomultiplier tube 18. The video amplifier serves to boost the output of the photomultiplier tube for application to "A" trace oscilloscope 20.

A standard light source 21 which can suitably be a mercury vapor light is mounted in container 11 in such a manner that it is viewable by photomultiplier tube 18. Light source 21 is operated by vibrator 22 in such a fashion that the light output is in a square wave off and on fashion. The photovoltaic cell 23 is positioned so light from standard light source 21 will fall thereon. A microammeter 24 is electrically connected to photovoltaic cell 23 to measure the current generated by this cell.

Details of the circuitry of the invention are shown in Fig. 2. The photomultiplier tube can suitably be a 1P21 tube. The output of the 1P21 tube is connected to a video amplifier consisting of 2 stages, ½ each of a 12AU7 tube with the suitable associated circuit components shown. The output of this video amplifier goes to the "A" trace oscilloscope as described above. The power supply for the video amplifier is shown consisting of two 6x4 tubes and related circuit components as shown. 115 v. A.C. power drives the power supply through a suitable transformer arrangement.

Also shown are detailed circuit components related to the mercury vapor light (standard light source), which can suitably be a General Electric #F-2T6BL tube, and a vibrator. Suitably a double pole single throw switch can be used to connect the 24 v. D.C. power to the vibrator and mercury vapor light and at the same time energize a shutter solenoid which will close shutter 16 of Fig. 1 at such time as the standard light source is being used. Also shown in Fig. 2 is a schematic view of the photovoltaic light cell, which can be a "Photronic" cell, model 594RR, made by the Weston Electrical Instruments Corporation, and an associated microammeter.

Figure 3:
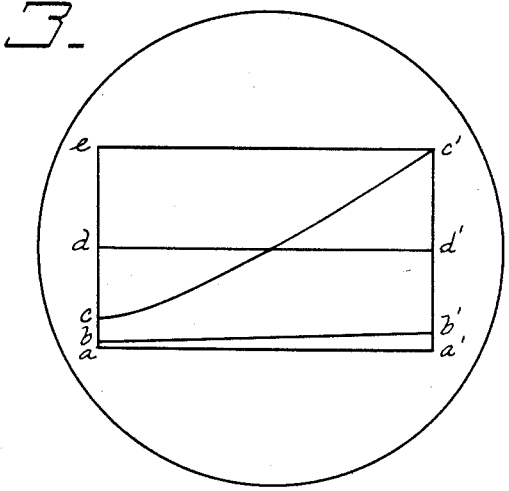
Fig. 3 is a view of the calibrated screen of the "A" trace oscilloscope.

Fig. 3 shows the calibrated screen of the "A" trace oscilloscope. Line $a$—$a'$ forms the base of the picture presentation. Line $d$—$d'$ in conjunction with line $a$—$a'$ are the calibration marks used with the standard light source. Lines $b$—$b'$ and $c$—$c'$ are the calibration lines used in conjunction with the radar screen picture. Lines $d$—$d'$ and $a$—$a'$ are calibration lines originally used in determining the location and shape of calibration lines $b$—$b'$ and $c$—$c'$ on the "A" trace oscilloscope screen.

Calibration lines $d$—$d'$ and $e$—$c'$ in addition to line $a$—$a'$ are more or less arbitrarily selected within the usable bounds of the "A" trace screen. The method of determining and positioning lines $b$—$b'$ and $c$—$c'$ is rather complex. It is accomplished in the following manner:

(1) A certain pulse repetition frequency (PRF), scan rate and range is selected on the radar indicator.

(2) A special circuit known as a pedestal producing circuit is provided for impressing a pedestal on the radar screen, e.g., a P.P.I. radar screen presentation. This pedestal circuit is designed to produce a pedestal of minimum practical width suitable for densitometer measurements.

(3) A specific microammeter reading, say 2, is selected and the standard light source intensity is adjusted to give this reading.

(4) The gain on the "A" trace oscilloscope is adjusted to cause the square wave output of the standard light source to fill the space between lines $a$—$a'$ and $d$—$d'$.

(5) The standard light source is then turned off and the pedestal circuit is allowed to actuate the "A" trace with the pedestal being located along the line $a'$—$c'$.

(6) The gain of the radar is adjusted to give a pedestal of height of $a'$—$c'$ on the "A" trace screen.

(7) The camera is then operated and pictures are taken of the radar screen using all stop openings from $f$ 2.3 to $f$ 16.

(8) The procedure of steps 3 through 7 is repeated for a series of meter readings covering the entire scale of the microammeter.

(9) The pedestal is next moved to about ¾ of the distance from the center of the radar presentation and steps 3 through 8 are repeated. Steps 3 through 8 are again repeated for the pedestal located at the ½ and ¼ range positions on the radar screen and the corresponding points on the "A" trace scope.

(10) If the radar on which the exposure meter is to be used has more than one range scale it will be necessary to repeat steps 3 through 9 for each range to obtain information needed to calculate the proper exposure.

(11) A graywedge which is a strip of material having a number of parts of varying known density with regard to the passage of light is placed on an unexposed portion of the film and this portion of the film is exposed to light in a conventional manner for measuring film characteristics. The number of density steps of the graywedge can suitably vary from about 12 to 21.

(12) The film is then developed in a conventional manner.

(13) The developed film is processed on a densitometer to determine the density of the annulus or pedestal portion of each picture and of the graywedge exposed portion of the film.

(14) To determine the limitations of exposure of the film a graph is made of the log of the exposure of each part of the graywedge exposed portion of the film vs. the density as determined by the densitometer. The linear portion of this graphical plot is selected as the usable working area for the film and scope calibration.

(15) From the information obtained experimentally above graphs are made. The graphs consist of a plot of meter readings vs. corresponding annuli photograph densitometer readings to give a family of curves with a separate curve for each $f$ stop. A separate graph is made for each different pedestal setting to avoid confusion. From the information obtained of the graywedge exposed part of the film, limitations determined as described in item 14 above are set on each of these graphs for maximum and minimum densities. In the calibration of the "A" trace screen, readings outside of the set density limitations are not used, so the "A" trace screen calibration insures that the exposure limitations of the film are not exceeded.

(16) The basic information contained in the graphs of item 15 are used to plot lines $b$—$b'$ and $c$—$c'$ of Fig. 3.

(17) The graphs of item 15 and in addition film speed information and radar antenna scan rate (r.p.m.) is used to make up a slide rule, table, nomograph, or other suitable device from which a suitable exposure may be calculated for the photography. If the pulse repetition frequency (PRF) and the range scale of the radar are changed, then it will be necessary to have additional scales on the slide rule or other device to compensate for these variables. Changes in antenna scan rate and pulse repetition frequency are linear function variables and the compensation scales for these variables are easily determined. Because of the phosphor decay effect the range compensation scale is not a linear function and an experimental calibration means such as described above is used to obtain the data for this range scale of the slide rule.

Two methods will be described for using the apparatus to determine the proper exposure for radar picture. In method number 1 the radar picture which it is desired to photograph is presented on the radar screen. The gain control of the "A" trace oscilloscope is adjusted to place the portion of the radar presentation which it is desired to expose correctly between the lines b—b' and c—c' (Fig. 3). Next the shutter is closed and the standard light source turned on. The intensity of the standard light source is adjusted so the amplitude of the square wave presented on the "A" trace oscilloscope fills the space between the lines a—a' and d—d'. The microammeter is then read and the f stop computed from a slide rule or other suitable device.

In method number 2 it is desired to photograph the radar presentation or picture at a certain f stop, say f 2.3. Then a slide rule or other suitable device is used to calculate the reading required on the microammeter. The standard light source is adjusted so the microammeter reads the computed value and the gain of the "A" trace oscilloscope is adjusted so the square wave corresponds to lines a—a' and d—d' (Fig. 3). Then the standard light source is turned off and the radar controls are adjusted to place the presentation on the "A" trace between the lines b—b' and c—c' (Fig. 4). Now the radar is set for the correct light intensity at the desired f stop of 2.3. Method number 2 is not the preferred method since it may result in photographing a poor radar presentation even though with a suitable exposure. Bloom effects on the radar screen sometimes cause difficulty.

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which may be made without departing from the spirit of the described invention or of the scope of the appended claims.

What is claimed is:

1. An exposure meter particularly useful for aiding in determining the proper exposure for photographing radar and television screen pictures comprising a photomultiplier tube positioned to view a cathode-ray tube presentation, a filter passing substantially only short persistence light positioned in the light path between said photomultiplier tube and the cathode-ray tube presentation, amplifier means connected to amplify the output of the photomultiplier tube, an "A" trace oscilloscope having a subject and standard light source calibrations on its screen connected to said amplifier, an off-on square wave mercury vapor light source of adjustable intensity viewable by said photomultiplier tube, a photovoltaic cell positioned to be exposed to the light from said light source, and a microammeter connected to said photovoltaic cell to measure the current generated therein by said light source as a quantitative indication of the intensity of said light source.

2. A radar exposure meter particularly useful for aiding in determining a suitable exposure for photographing radar screen pictures comprising a light-tight container having an opening for a radar screen and a second opening for a camera to photograph the radar screen, photoelectric means viewing the radar screen opening, a filter passing substantially only short persistence light positioned in the light path between said photoelectric means and the radar screen opening, an oscilloscope having a calibrated screen connected to said photoelectric means, a mercury vapor light source of adjustable intensity viewable by said photoelectric means, a vibrator connected to operate said light source in a square wave off-on fashion, a photovoltaic cell positioned so light from said source will fall thereon, and a microammeter connected to said photovoltaic cell to measure the current generated by said cell as an indication of the proper exposure for the photograph.

3. A radar exposure meter particularly useful for aiding in determining a suitable exposure for photographing radar screen pictures comprising a light-tight container having an opening for a radar screen and a second opening for a camera to photograph the radar screen, a photomultiplier tube viewing the radar screen opening, a filter passing substantially only short persistence light positioned in the light path between said photomultiplier tube and the radar screen opening, an amplifier connected to the output of said photomultiplier tube, an "A" trace oscilloscope having subject and standard light source calibrations on the screen thereof connected to said amplifier, a mercury vapor light source of adjustable intensity viewable by said photomultiplier tube, a vibrator connected to operate said light source in a square wave off-on fashion, a photovoltaic cell positioned so light from said light source will fall thereon, and a microammeter connected to said photovoltaic cell to measure the current generated by said cell as an indication of the proper exposure for the photograph.

4. A radar exposure meter particularly useful for aiding in determining suitable exposure for photographing radar screen pictures comprising a light-tight container having an opening for a radar screen and a second opening for a camera to photograph the radar screen, a shutter covering the radar screen opening in said box, a photomultiplier tube viewing the radar screen opening, a filter passing substantially only short persistence light positioned in the light path between said photomultiplier tube and the radar screen opening, a glass plate positioned in said box to transmit a major portion of the light from the radar screen opening to the camera opening and to reflect a minor portion of the light from the radar screen opening on said photomultiplier tube, a video amplifier connected to the output of said photomultiplier tube, an "A" trace oscilloscope having subject and standard light source calibrations on the screen thereof connected to said amplifier, a mercury vapor light source of adjustable intensity viewable by said photomultiplier tube, a vibrator connected to operate said light source in a square wave off-on fashion, solenoid means to operate said shutter closing the radar screen opening in said box when said vibrator is energized to operate said light source, a photovoltaic cell positioned so light from said light source will fall thereon, and a microammeter connected to said photovoltaic cell to measure the current generated by said cell as an indication of the proper exposure for the photograph.

5. An exposure meter comprising a container having a first opening for viewing a first source of light constituted by an image displayed on the screen of a cathode ray tube entry of an image to be viewed, and also having a second opening through which a camera may photograph said image, a shutter positioned to control the photographing cycle, a phototube positioned to respond to a reflected portion of the light emitted from said first light source, a second source of light, said second light source also being positioned to influence operation of said phototube and thereby facilitate exposure measurements, vibrator circuitry including a D.C. voltage source, a solenoid operative when energized to close said shutter, and a vibrator to energize said second light source and said solenoid only during alternate time periods when said first light source is inaccessible for measurement due to closure of said shutter, means for measuring the light from said second light source during said alternate periods when said first light source cannot be measured, and separate means for measuring the light from said first light source during alternate time periods when said shutter is open and said second light source is de-energized.

6. An exposure meter comprising a container having a first opening for viewing a first source of light constituted by an image displayed on the screen of a cathode ray tube entry of an image to be viewed, and also having a second opening through which a camera may photograph said image, a shutter positioned to control the photographing cycle, a phototube positioned to respond to a reflected portion of the light emitted from said first light source, a second source of light, said second light source also being positioned to influence operation of said phototube, and thereby facilitate exposure measurements, means including a solenoid in circuit with said second light source to close said shutter and thereby prevent measurement of the light from said first light source whenever said solenoid and said second light source are energized, means for simultaneously energizing said solenoid and said second light source, means for measuring the light from said second light source during periods of energization thereof, and means for measuring the light from said first light source only during periods of de-energization of said first light source.

References Cited in the file of this patent
UNITED STATES PATENTS

| | | |
|---|---|---|
| 1,961,913 | Reynolds et al. | June 5, 1934 |
| 2,095,312 | Cahn | Oct. 12, 1937 |
| 2,483,147 | Mol | Sept. 27, 1949 |
| 2,561,612 | Culver | July 24, 1951 |
| 2,565,399 | Simmon | Aug. 21, 1951 |
| 2,680,200 | Hercock | June 1, 1954 |